(12) United States Patent
Plewnia

(10) Patent No.: US 7,805,485 B2
(45) Date of Patent: Sep. 28, 2010

(54) WEB SERVICES INTERFACE EXTENSION CHANNEL

(75) Inventor: Boguslaw Ludwik Plewnia, Mission Viejo, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 193 days.

(21) Appl. No.: 12/011,616

(22) Filed: Jan. 28, 2008

(65) Prior Publication Data

US 2009/0193132 A1 Jul. 30, 2009

(51) Int. Cl.
 *G06F 15/16* (2006.01)
(52) U.S. Cl. .................. 709/203; 709/223; 709/230; 713/175; 710/8
(58) Field of Classification Search ............. 709/203, 709/223, 230; 713/175; 710/8
 See application file for complete search history.

(56) References Cited

U.S. PATENT DOCUMENTS

| | | | |
|---|---|---|---|
| 6,801,604 B2 | 10/2004 | Maes et al. | 379/88.17 |
| 6,904,600 B1 | 6/2005 | James et al. | 719/328 |
| 7,028,223 B1 | 4/2006 | Kolawa et al. | 714/38 |
| 7,151,966 B1 | 12/2006 | Baier et al. | 700/19 |
| 7,392,391 B2 * | 6/2008 | Eibach et al. | 713/175 |
| 7,624,404 B2 | 11/2009 | Yagi | 719/330 |
| 2003/0074401 A1 | 4/2003 | Connell | 709/203 |
| 2003/0088421 A1 | 5/2003 | Maes et al. | 704/270.1 |
| 2003/0110373 A1 | 6/2003 | Champion | 713/153 |
| 2003/0158956 A1 | 8/2003 | Tanaka et al. | 709/230 |
| 2003/0163694 A1 | 8/2003 | Chen et al. | 713/170 |
| 2004/0054690 A1 | 3/2004 | Hillerbrand et al. | 707/104.1 |
| 2004/0088713 A1 | 5/2004 | Myllymaki et al. | 719/315 |
| 2004/0093580 A1 | 5/2004 | Carson et al. | 717/101 |
| 2004/0193703 A1 | 9/2004 | Loewy et al. | 709/220 |
| 2004/0225656 A1 | 11/2004 | Sarkar | 707/9 |
| 2004/0225657 A1 | 11/2004 | Sarkar | 707/9 |
| 2004/0237038 A1 | 11/2004 | Stuhec | 715/234 |
| 2005/0050299 A1 | 3/2005 | Joseph | 712/1 |
| 2005/0132094 A1* | 6/2005 | Wu | 710/8 |
| 2005/0138634 A1 | 6/2005 | Luty et al. | 719/315 |
| 2005/0164704 A1 | 7/2005 | Winsor | 455/432.5 |
| 2005/0182843 A1* | 8/2005 | Reistad et al. | 709/230 |
| 2005/0216199 A1 | 9/2005 | Banet | 702/19 |
| 2005/0228984 A1 | 10/2005 | Edery et al. | 713/153 |
| 2005/0267979 A1 | 12/2005 | Bailey | 709/230 |
| 2006/0031441 A1* | 2/2006 | Davis et al. | 709/223 |
| 2006/0077422 A1 | 4/2006 | Mathieson et al. | 358/1.15 |
| 2006/0077423 A1 | 4/2006 | Mathieson et al. | 358/1.15 |
| 2006/0077464 A1 | 4/2006 | Mathieson et al. | 358/1.18 |
| 2006/0085638 A1 | 4/2006 | Phillips et al. | 713/168 |
| 2006/0095536 A1 | 5/2006 | Mathieson et al. | 709/217 |
| 2006/0100935 A1 | 5/2006 | Klawitter et al. | 705/26 |
| 2006/0117084 A1* | 6/2006 | Morozumi et al. | 709/203 |
| 2006/0150026 A1 | 7/2006 | Kolawa et al. | 714/38 |
| 2006/0167983 A1 | 7/2006 | Webb | 709/203 |
| 2006/0179421 A1 | 8/2006 | Bielski et al. | 717/115 |
| 2006/0200747 A1 | 9/2006 | Bhatia et al. | 715/203 |
| 2006/0200753 A1 | 9/2006 | Bhatia et al. | 715/203 |
| 2006/0218102 A1 | 9/2006 | Gibson et al. | 705/80 |
| 2007/0055678 A1 | 3/2007 | Fung et al. | 707/100 |

\* cited by examiner

*Primary Examiner*—Wing F Chan
*Assistant Examiner*—Ruolei Zong
(74) *Attorney, Agent, or Firm*—Scot A. Reader

(57) ABSTRACT

A Web Services interface extension channel exposes new operations for a Web Service without requiring changes to the WSDL definitions for the Web Service. In some embodiments, extended operation requests and responses are transmitted over the extension channel using SOAP methods reserved for extended operation requests and responses, respectively.

12 Claims, 27 Drawing Sheets

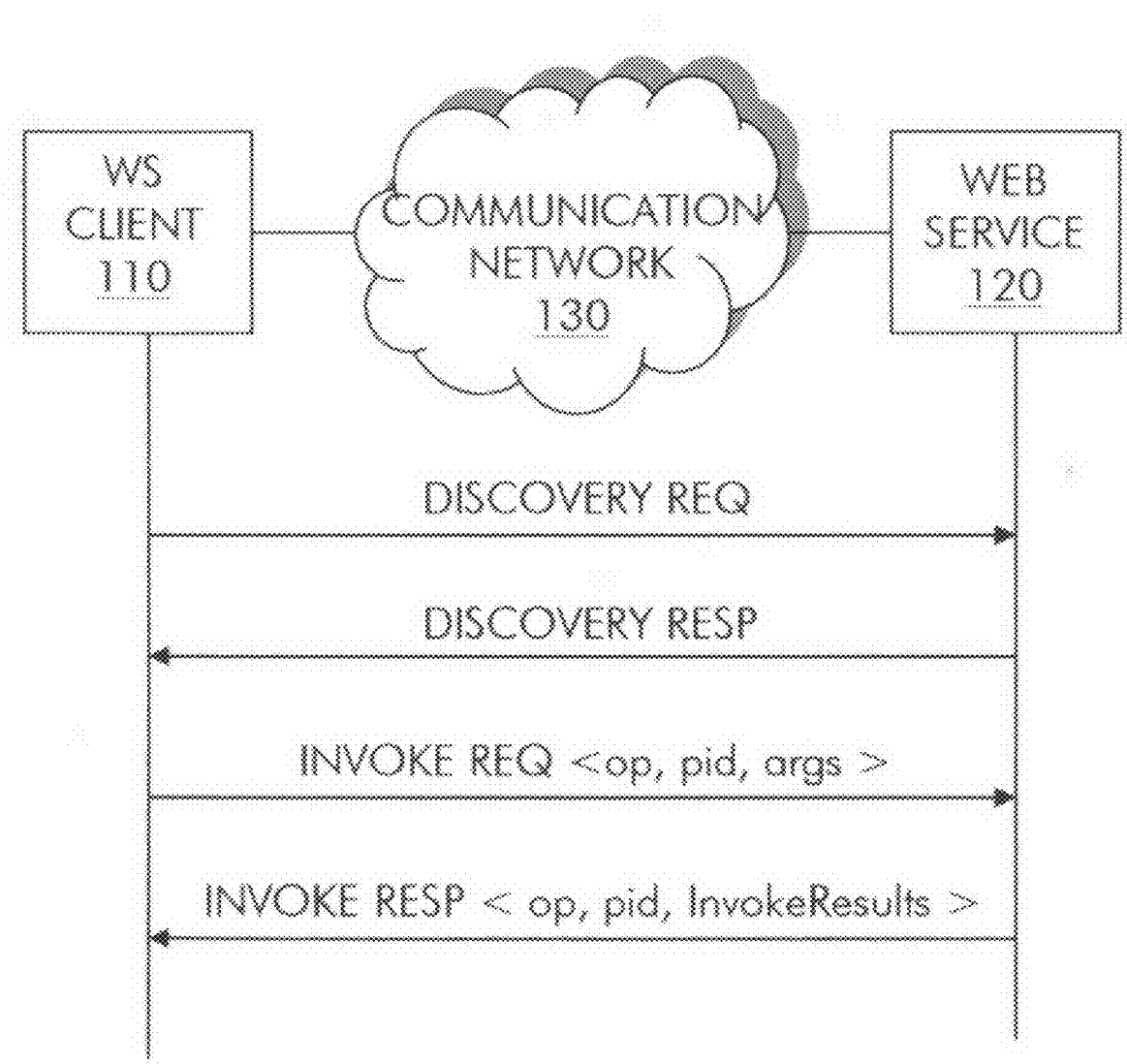

```
<!--
// OPERATION NAME   : "op1"
// RETURN TYPE      : VOID
// ARGUMENTS        : none
//_1
//_2
-->
<complex sys-name="op1" isType="operation" minOccurs="0" maxOccurs="1" />
<property sys-name="op2" isType="operation" minOccurs="0" maxOccurs="1" />
```

Figure 2A

```
<!--
// OPERATION NAME    : "op2a"
// RETURN TYPE       : VOID
// ARGUMENTS         : The "op2a" method takes two simple type arguments
//_1                 : color-mode is enum type
//_2                 : pdf-password is a string type
-->
<complex sys-name="op2a" isType="operation" minOccurs="0" maxOccurs="1">
<!-- SYSTEM VARIABLE: <color-mode/>                                    -->
<property sys-name="color-mode" isType="list" minOccurs="1" maxOccurs="1">
    <value>AUTO</value>
    <allowedValueList>
        <allowed>AUTO</allowed>
        <allowed>MONOCHROME</allowed>
        <allowed>GRAYSCALE</allowed>
        <allowed>FULL_COLOR</allowed>
    <allowedValueList>
</property>
<!-- SYSTEM VARIABLE: <pdf-password/>                                  -->
<property sys-name="pdf-passowrd" isType="string" minOccurs="1" maxOccurs="1">
    <appInfo>
        <hasConstraint name="minLength">0</hasConstraint>
        <hasConstraint name="maxLength">32</hasConstraint>
    </appInfo>
    <value></value>
</property>
</complex>
```

Figure 2B

```
<!--
// OPERATION NAME    : "op2b"
// RETURN TYPE       : VOID
// ARGUMENTS         : The "op2b" method takes three arguments
//  1                : color-mode is enum type
//  2                : pdf-password is a string type
//  3                : UsernameToken is a complex type data definition, a structure
-->
<complex sys-name="op2b" isType="operation" minOccurs="0" maxOccurs="1">
<!-- SYSTEM VARIABLE: <color-mode/>    -->
<property sys-name="color-mode" isType="list" minOccurs="1" maxOccurs="1">
  <value>AUTO</value>
  <allowedValueList>
    <allowed>AUTO</allowed>
    <allowed>MONOCHROME</allowed>
    <allowed>GRAYSCALE</allowed>
    <allowed>FULL_COLOR</allowed>
  </allowedValueList>
</property>
<!-- SYSTEM VARIABLE: <pdf-password/>    -->
<property sys-name="pdf-passowrd" isType="string" minOccurs="1" maxOccurs="1">
  <appInfo>
    <hasConstraint name="minLength">0</hasConstraint>
    <hasConstraint name="maxLength">32</hasConstraint>
  </appInfo>
  <value></value>
</property>
```

Figure 2C

```
<!-- SYSTEM VARIABLE: <UsernameToken /> -->
<complex sys-name="UsernameToken" isType="sequence" minOccurs="1" maxOccurs="1">
    <!-- SYSTEM VARIABLE: <user-name /> -->
    <property sys-name="user-name" isType="string" minOccurs="1" maxOccurs="1">
        <appInfo>
            <hasConstraint name="minLength">0</hasConstraint>
            <hasConstraint name="maxLength">32</hasConstraint>
        </appInfo>
        <value>anonymous</value>
    </property>
    <!-- SYSTEM VARIABLE: <password /> -->
    <property sys-name="password" isType="string" minOccurs="1" maxOccurs="1">
        <appInfo>
            <hasConstraint name="minLength">0</hasConstraint>
            <hasConstraint name="maxLength">32</hasConstraint>
        </appInfo>
        <value></value>
    </property>
</complex>
</complex>
```

Figure 2D

```
<!--
// OPERATION NAME    : "op3a"
// RETURN TYPE       : returns a string
// ARGUMENTS         : This method does not take any arguments
// 1                 :
// 2                 :
-->
<complex sys-name="op3a" isType="operation" minOccurs="0" maxOccurs="1">
<complex sys-name="$$results">
<!-- SYSTEM VARIABLE:  <password />   -->
<property sys-name="password" isType="string" minOccurs="1" maxOccurs="1" />
    <appInfo>
        <hasConstraint name="minLength">0</hasConstraint>
        <hasConstraint name="maxLength">32</hasConstraint>
    </appInfo>
    <value></value>
    </property>
</complex>
</complex>
```

Figure 2E

```
<!--
// OPERATION NAME   : "op4"
// RETURN TYPE      : returns a string
// ARGUMENTS        : The "op4" method takes three arguments
//_1                : color-mode is enum type
//_2                : pdf-password is a string type
//_3                : UsernameToken is a complex type data definition, a structure
-->
<complex sys-name="op4" isType="operation" minOccurs="0" maxOccurs="1">
<!-- SYSTEM VARIABLE: <color-mode/> -->
<property sys-name="color-mode" isType="list" minOccurs="1" maxOccurs="1">
    <value>AUTO</value>
    <allowedValueList>
        <allowed>AUTO</allowed>
        <allowed>MONOCHROME</allowed>
        <allowed>GRAYSCALE</allowed>
        <allowed>FULL_COLOR</allowed>
    </allowedValueList>
</property>
<!-- SYSTEM VARIABLE: <pdf-password/> -->
<property sys-name="pdf-passowrd" isType="string" minOccurs="1" maxOccurs="1">
    <appInfo>
        <hasConstraint name="minLength">0</hasConstraint>
        <hasConstraint name="maxLength">32</hasConstraint>
    </appInfo>
    <value></value>
</property>
```

Figure 2F

```
<!-- SYSTEM VARIABLE: <UsernameToken /> -->
<complex sys-name="UsernameToken" isType="sequence" minOccurs="1" maxOccurs="1">
<!-- SYSTEM VARIABLE: <user-name /> -->
<property sys-name="user-name" isType="string" minOccurs="1" maxOccurs="1">
  <appInfo>
    <hasConstraint name="minLength">0</hasConstraint>
    <hasConstraint name="maxLength">32</hasConstraint>
  </appInfo>
  <value>anonymous</value>
</property>
<!-- SYSTEM VARIABLE: <password /> -->
<property sys-name="password" isType="string" minOccurs="1" maxOccurs="1">
  <appInfo>
    <hasConstraint name="minLength">0</hasConstraint>
    <hasConstraint name="maxLength">32</hasConstraint>
  </appInfo>
  <value></value>
</property>
</complex>
```

Figure 2G

```
<complex sys-name="$$results">
<!-- SYSTEM VARIABLE: <password /> -->
<property sys-name="password" isType="string" minOccurs="1" maxOccurs="1" />
    <appInfo>
        <hasConstraint name="minLength">0</hasConstraint>
        <hasConstraint name="maxLength">32</hasConstraint>
    </appInfo>
    <value></value>
</property>
</complex>
```

Figure 2H

```
<!--
// OPERATION NAME    : "op5"
// RETURN TYPE       : returns a complex type
// ARGUMENTS         : This method does not take any arguments
//_1
//_2
-->
<complex sys-name="op5" isType="operation" minOccurs="0" maxOccurs="1">
<complex sys-name="$$results">
<complex sys-name="UsernameToken" isType="sequence" minOccurs="1" maxOccurs="1">
<!--SYSTEM VARIABLE:   <user-name />
<property sys-name="user-name" isType="string" minOccurs="1" maxOccurs="1">
    <appInfo>
        <hasConstraint name="minLength">0</hasConstraint>
        <hasConstraint name="maxLength">32</hasConstraint>
    </appInfo>
    <value>anonymous</value>
</property>
```

Figure 21

```
<!--SYSTEM VARIABLE:  <password />
<property sys-name="password" isType="string" minOccurs="1" maxOccurs="1">
    <appInfo>
        <hasConstraint name="minLength">0</hasConstraint>
        <hasConstraint name="maxLength">32</hasConstraint>
    </appInfo>
    <value></value>
</property>
</complex>
</complex>
```

Figure 2J

```
<s:complexType name="OPAQUE_DATA_TYPE">
  <s:sequence>
    <s:any namespace="##any" processContents="lax" minOccurs="0"
      maxOccurs="unbounded" />
  </s:sequence>
  <s:anyAttribute namespace="##other" processContents="lax" />
</s:complexType>
<s:element name="Invoke">
  <s:complexType>
    <s:sequence>
      <s:element minOccurs="0" maxOccurs="1" name="args" type="OPAQUE_DATA_TYPE" />
    </s:sequence>
    <s:attribute name="op" type="string" use="required" />
    <s:attribute name="pid" type="string" use="required" />
  </s:complexType>
</s:element>
<s:element name="InvokeResponse">
  <s:complexType>
    <s:sequence>
      <s:element minOccurs="0" maxOccurs="1" name="InvokeResults"
        type="OPAQUE_DATA_TYPE" />
    </s:sequence>
    <s:attribute name="op" type="string" use="required" />
    <s:attribute name="pid" type="string" use="required" />
  </s:complexType>
</s:element>
```

Figure 3

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
<soap:Body>
<Invoke op="fnGetLedStatus" pid="1234">
<args>
<property sys-name="LED_ADDRESS">COPY_MODE_LED</property>
</args>
</Invoke>
</soap:Body>
</soap:Envelope>
```

Figure 4A

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
<soap:Body>
<InvokeResponse op="fnGetLedStatus" pid="1234" >
<InvokeResults>
<property sys-name="COPY_MODE_LED_STATUS">STATUS_ON</property>
</InvokeResults>
</InvokeResposne>
</soap:Body>
</soap:Envelope>
```

Figure 4B

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
  <soap:Body>
    <Invoke op="op1" pid="1234" />
  </soap:Body>
</soap:Envelope>
```

Figure 5A

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
<soap:Body>
<Invoke op="op1" pid="1234">
<args />
</Invoke>
</soap:Body>
</soap:Envelope>
```

Figure 5B

```
<?xml version="1.0" encoding="utf-8"?>
<soap:Envelope xmlns:soap="http://schemas.xmlsoap.org/soap/envelope/"
   xmlns:xsi="http://www.w3.org/2001/XMLSchema-instance"
   xmlns:xsd="http://www.w3.org/2001/XMLSchema" >
 <soap:Body>
  <Invoke op="op2a" pid="1234" >
   <args>
    <property sys-name="color-mode">AUTO</property>
    <property sys-name="pdf-password">ILoveHorses</property>
   </args>
  </Invoke>
 </soap:Body>
</soap:Envelope>
```

Figure 5C

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
    <soap:Body>
        <Invoke op="op2b" pid="1234" >
            <args>
                <property sys-name="color-mode">AUTO</property>
                <property sys-name="pdf-password">ILoveHorses</property>
                <complex sys-name="UsernameToken">
                    <property sys-name="user-name">bogdan</property>
                    <property sys-name="pdf-password">ILoveHorses</property>
                </complex>
            </args>
        </Invoke>
    </soap:Body>
</soap:Envelope>
```

Figure 5D

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
  <soap:Body>
    <InvokeResponse op="op1" pid="1234" />
  </soap:Body>
</soap:Envelope>
```

Figure 6A

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
    <soap:Body>
        <InvokeResponse op="op3a" pid="1234" >
            <InvokeResults>
                <property sys-name="password" >ILoveHorses</property>
            </InvokeResults>
        </InvokeResponse>
    </soap:Body>
</soap:Envelope>
```

Figure 6B

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
  <soap:Body>
    <InvokeResponse op="op5" pid="1234" >
      <InvokeResults>
        <complex sys-name="UsernameToken">
          <property sys-name="user-name">bogdan</property>
          <property sys-name="password">ILoveHorses</property>
        </complex>
      </InvokeResults>
    </InvokeResponse>
  </soap:Body>
</soap:Envelope>
```

Figure 6C

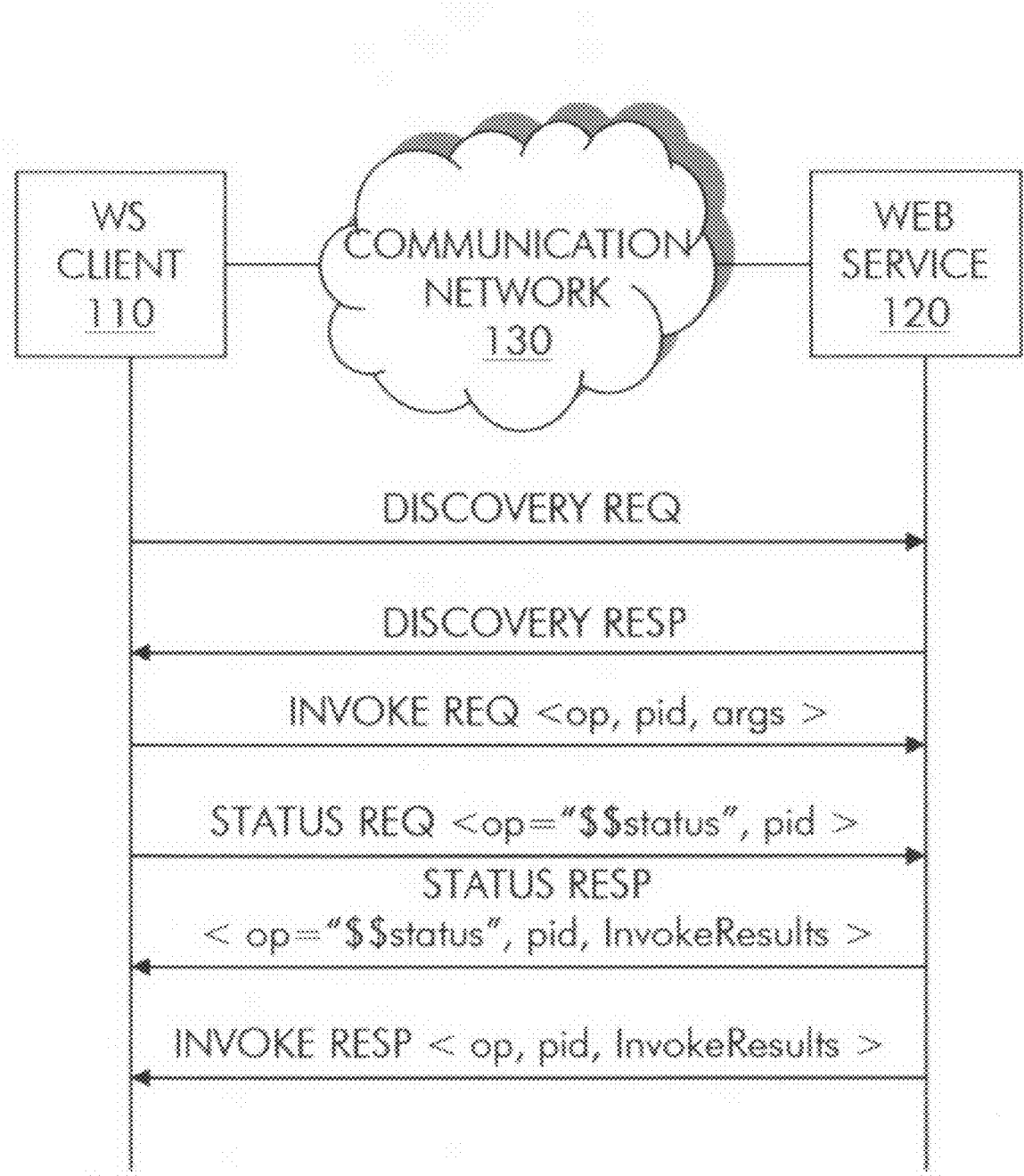

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">

<soap:Body>
    <Invoke op="$$status" pid="1234" />
  </soap:Body>
</soap:Envelope>
```

Figure 8A

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
  <soap:Body>
    <InvokeResponse op="$$status" pid="1234" >
      <InvokeResults>
        <property sys-name="$$status">RUNNING</property>
      </InvokeResults>
    </InvokeResponse>
  </soap:Body>
</soap:Envelope>
```

Figure 8B

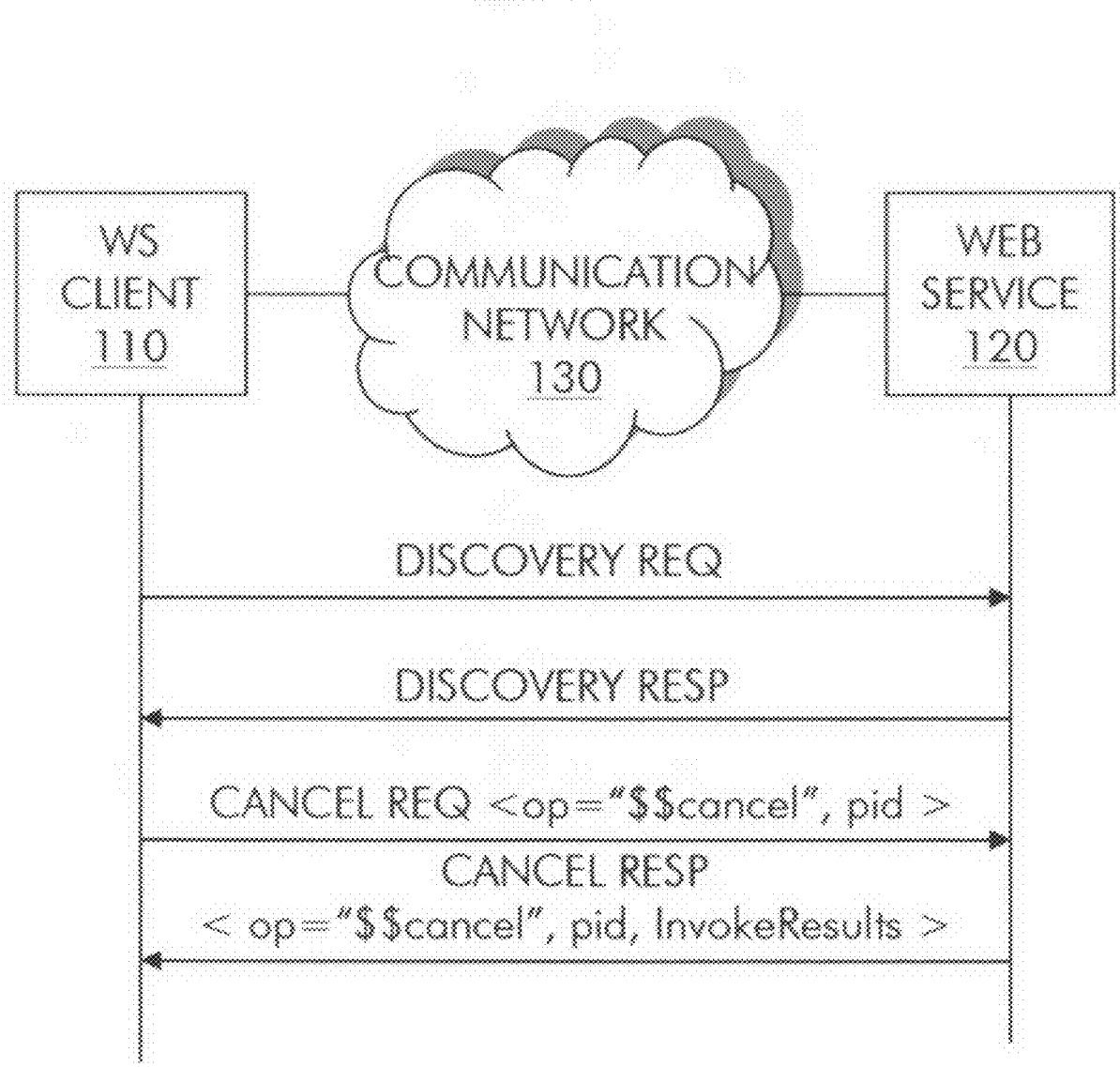

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
  <soap:Body>
    <Invoke op="$$cancel" pid="1234" />
  </soap:Body>
</soap:Envelope>
```

Figure 10A

```
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema" >
<soap:Body>
<InvokeResponse op="$$cancel" pid="1234" >
<InvokeResults>
<property sys-name="$$status">CANCELLED</property>
</InvokeResults>
</InvokeResponse>
</soap:Body>
</soap:Envelope>
```

Figure 10B

WEB SERVICES INTERFACE EXTENSION CHANNEL

BACKGROUND OF THE INVENTION

The present invention relates to Web Services and, more particularly, to extending the operations that can be invoked on a given Web Service without changing the Web Services Description Language (WSDL) definitions for the Web Service.

A Web Service is a software system that supports interoperable machine to machine interaction over a data communication network. In the domain of Web Services, the operations that can be invoked on a given Web Service are typically defined in a WSDL definition document for the Web Service. Sometimes business needs or a change in feature set supported on a server platform make it desirable to add new operations to the Web Service. The addition of new operations, however, presents certain technical challenges.

Conventionally, new operations have been incorporated by updating the WSDL definition document for the Web Service. However, this can introduce backward compatibility problems for older applications that rely on the original WSDL definitions. While it is possible to address backward compatibility problems by versioning the Web Service to allow older applications to use the original WSDL definitions and newer applications to use the updated WSDL definitions, allowing multiple versions of WSDL definitions to coexist for a given Web Service adds substantial complexity.

SUMMARY OF THE INVENTION

The present invention, in a basic feature, provides a Web Services interface extension channel that exposes new operations for a Web Service without requiring changes to the WSDL definitions for the Web Service. In some embodiments, extended operation requests and responses are transmitted over the extension channel using SOAP (formerly "Simple Object Access Protocol" but now just "SOAP") methods reserved for extended operation requests and responses, respectively.

In one aspect of the invention, in a communication system having a service adapted to execute defined operations and extended operations and a client adapted to request execution by the service of defined operations and extended operations, a method performed by the client for invoking at least one of the extended operations comprises the steps of transmitting by the client to the service an extended operation invocation request identifying the at least one extended operation and receiving by the client from the service in response to the request an extended operation invocation response having a result obtained through execution by the service of the at least one extended operation.

In some embodiments, the defined operations are defined in a WSDL definition document for the service and the extended operations are not defined in any WSDL definition document for the service.

In some embodiments, the extended operations are enabled for the service after the defined operations.

In some embodiments, the request utilizes a SOAP method reserved for extended operation requests.

In some embodiments, the response utilizes a SOAP method reserved for extended operation responses.

In some embodiments, the request and the response each comprise an operation identifier that uniquely identifies the invoked extended operation.

In some embodiments, the request and the response each comprise a transaction identifier that uniquely identifies a transaction between the client and the service.

In some embodiments, the method further comprises the steps of transmitting by the client to the service an extended operation status request having the transaction identifier and receiving by the client from the service in response to the extended operation status request an extended operation status response reporting operational status of the transaction.

In some embodiments, the method further comprises the step of receiving by the client from the service an extended operation discovery message reporting availability of the at least one extended operation.

In another aspect of the invention, in a communication system having a service adapted to execute defined operations and extended operations and a client adapted to request execution by the service of defined operations and extended operations, a method performed by the service for executing at least one of the extended operations invoked by the client comprises the steps of receiving by the service from the client an extended operation invocation request identifying the at least one extended operation and transmitting by the service to the client in response to the request an extended operation invocation response having a result obtained through execution by the service of the at least one extended operation.

In yet another aspect of the invention, in a communication system having a service adapted to execute defined operations and extended operations and a client adapted to request execution by the service of defined operations and extended operations, a method performed by the client for invoking at least one of the extended operations comprises the steps of transmitting by the client to the service an extended operation invocation request having a transaction identifier uniquely identifying a transaction, transmitting by the client to the service an extended operation status request having the transaction identifier and receiving by the client from the service an extended operation status response having the transaction identifier and reporting operational status of the transaction, wherein the invocation request and the status request utilize a SOAP method reserved for extended operation requests and the status response utilizes a SOAP method reserved for extended operation responses.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 1 shows message flows between a Web Service client and a Web Service in a communication system for invoking an extended operation executable by the Web Service.

FIGS. 2A through 2J are user screens showing eXtensible Markup Language (XML) descriptors of exemplary extended operations executable by the Web Service.

FIG. 3 is a user screen showing extended operation invocation request and response definitions.

FIG. 4A is a user screen showing an exemplary extended operation invocation request.

FIG. 4B is a user screen showing an exemplary extended operation invocation response.

FIGS. 5A through 5D are user screens showing further exemplary extended operation invocation requests.

FIGS. 6A through 6C are user screens showing further exemplary extended operation invocation responses.

FIG. 7 shows message flows between a Web Service client and a Web Service in a communication system for invoking an extended operation executable by the Web Service and checking operational status of the transaction.

FIG. 8A is a user screen showing an exemplary extended operation status request.

FIG. 8B is a user screen showing an exemplary extended operation status response.

FIG. 9 shows message flows between a Web Service client and a Web Service in a communication system for requesting invocation of an extended operation executable by the Web Service and then terminating the transaction.

FIG. 10A is a user screen showing an exemplary extended operation termination request.

FIG. 10B is a user screen showing an exemplary extended operation termination response.

DETAILED DESCRIPTION OF A PREFERRED EMBODIMENT

FIG. 1 shows message flows between a Web Service client 110 and a Web Service 120 in a communication system. The messages are transmitted over a communication network 130 for invoking an extended operation executable by Web Service 120. Communication network 130 may include one or more multiplexing nodes, such as switches, routers and bridges and may traverse the Internet. Alternatively, client 110 and Web Service 120 may communicate on a direct link. Web Service 120 is a software element implemented by a processor on a Web Services host device. By way of example, the Web Services host device may be a Web content server or a multifunction printer (MFP). Defined operations supported by Web Service 120 are defined in a WSDL definition document on the Web Services host device. Extended operations supported by Web Service 120 are not defined in any WSDL definition document. Extended operations supported by Web Service 120 become enabled after defined operations, and are advantageously made available without changing the WSDL definition document. This is achieved through the expedient of a Web Services interface extension channel that is described herein in some embodiments.

Client 110 is a software element that is implemented by a processor on a client host device. The client host device may be, for example, a personal computer, a mobile phone or a personal data assistant (PDA). Client 110 discovers and invokes extended operations of Web Service 120 through a request and response protocol. Client 110 discovers available extended operations by issuing to Web Service 120 an extended operations discovery request (DISCOVERY REQ) and receiving from Web Service 120 in response to the discovery request an extended operations discovery response (DISCOVERY RESP) containing extended operations information. In some embodiments, the discovery request and response are SOAP messages using XML descriptor types. For example, in the Sharp Open Systems Architecture (OSA), the discovery request may be a GetJobSettableElements SOAP message using the XML_DOC_SET_TYPE descriptor type to request extended operations information and the discovery response may be a GetJobSettableElementsResponse SOAP message using the XML_DOC_DSC_TYPE descriptor type to express extended operations information.

Turning now to FIGS. 2A through 2J, user screens show XML descriptors of exemplary operations described to client 110 by Web Service 120 in discovery responses in some embodiments of the invention. XML descriptors are shown for six exemplary operations, styled "op1" (FIG. 2A), "op2a" (FIG. 2B), "op 2b" (FIGS. 2C and 2D), "op3a" (FIG. 2E), "op4" (FIGS. 2F, 2G and 2H) and "op5" (FIGS. 2I and 2J), respectively. The XML descriptors conform to the XML_DOC_DSC_TYPE schema definition which defines an XML descriptor type suitable for describing the operation type property. The XML descriptors each have an operation identifier and describe arguments and results associated with the operation identifier. In these descriptors, the following definitions apply:

complex sys-name is an attribute whose value specifies the name of a complex system variable that is being described. A complex system may include zero or more nested property descriptions.

IsType is an attribute whose value specifies the type of descriptor. In this case the descriptor type is "operation".

minOccurs is an attribute whose value specifies the minimum number of occurrences of the system variable that is being described. Where the minimum number of occurrences is zero, the system variable is optional.

maxOccurs is an attribute whose value specifies the maximum number of occurrences of the system variable that is being described. Where the maximum number of occurrences is one, the system variable, is unique.

property sys-name is an attribute whose value specifies the name of a simple system variable (i.e. property) that is being described. There may be zero or more nested property descriptions within a complex system.

allowedValueList is an element of a property description that contains a list of permitted values for the property.

value is an element of a property description that specifies a default value for the property.

allowed is an element of a property description that specifies a permitted value of the property.

appInfo is an element of a property description that contains a list of rules or constraints on the property.

hasConstraint name="minlength" is an element of a property description that specifies a minimum permitted length of the property.

hasConstraint name="maxlength" is an element of a property description that specifies a maximum permitted length of the property.

For example, in FIGS. 2F, 2G and 2H, operation "op4" is indicated to be associated with three arguments involving a color mode, a PDF password and a user token, respectively. A list of permitted values is defined for the color mode, a length constraint is defined for the PDF password and username and password elements having respective length constraints are defined for the user token. A password returned as a result of the operation, and a length constraint for the password, are also defined.

Once client 110 has discovered available extended operations through a discovery protocol, client 110 invokes an extended operation by issuing to Web Service 120 an extended operation invocation request message (INVOKE REQ) and receiving from Web Service 120 in response to the invocation request an extended operation invocation response message (INVOKE RESP). The invocation request and response messages each include an operation identifier (op) that uniquely identifies the invoked extended operation and a transaction identifier (pid) that uniquely identifies the transaction between client 110 and Web Service 120. The invocation request message may additionally include arguments (args) that specify a requested action while the invocation response message type may additionally include a result (InvokeResults) generated by Web Service 120 through execution of the requested extended operation. The invocation request and response are one-way messages in that any result produced through execution of the requested extended action is not returned in the context of the call but rather delivered in a separate message (e.g. INVOKE RESP). In some embodiments, the invocation request and response messages are SOAP messages utilizing SOAP methods that are reserved for extended operations requests and responses, respectively, and together define a Web Services interface extension channel that exposes the extended operations of Web Service 120 without requiring changes to the original WSDL definition document. In some embodiments, the invocation request message is a SOAP message using the SOAP method "Invoke" and XML_DOC_SET_TYPE descriptor type to express the requested extended operation while the invocation response message is a SOAP message using the SOAP method "InvokeResponse" and the XML_DOC_DSC_TYPE descriptor type to express the result obtained through execution of the requested extended operation.

FIG. 3 is a user screen showing extended operation invocation request and response definitions in some embodiments of the invention. In the figure, an extended operation invocation request message is defined as a SOAP message using the SOAP method "Invoke" in which operation identifier and transaction identifier are required strings and arguments are optional. An extended operation invocation response message is defined as a SOAP message using the SOAP method "InvokeResponse" in which operation identifier and transaction identifier are required strings and results are optional.

Referring now to FIGS. 4A and 4B, user screens illustrate a hypothetical extended operation invocation request and response pair used to discover the status of a copy mode light emitting diode (LED). An exemplary invocation request is shown in FIG. 4A as a SOAP message using the SOAP method "Invoke". The SOAP message type includes an XML declaration that specifies XML version and character encoding followed by a SOAP header that includes a SOAP envelope tag that specifies the SOAP message encoding style and namespace identifiers. The SOAP header is followed by a SOAP body that includes a SOAP method tag "Invoke" indicating the SOAP method followed by an operation identifier "fnGetLedStatus", a transaction identifier "1234" and an argument directed at discovering the status of a copy mode LED. An exemplary invocation response to the invocation request is described in FIG. 4B as a SOAP message type that includes the same SOAP header and a SOAP body that includes a different SOAP method tag "InvokeResponse" indicating a different SOAP method, the same operation identifier "fnGetLedStatus", the same transaction identifier "1234" and a result that reveals that the status of the copy mode LED as "on". In FIGS. 5A through 5D, user screens show further examples of extended operation invocation requests in the form of SOAP messages using the SOAP method "Invoke" that is reserved for extended operations requests, while FIGS. 6A through 6C provide user screens that show further examples of extended operation invocation responses in the form of SOAP messages using the SOAP method "InvokeResponse" that is reserved for extended operations responses. While the transaction identifier in all of these figures is indicated to be "1234" for simplicity's sake, it will be appreciated that in practice a unique transaction identifier is assigned for each distinct transaction.

Turning now to FIG. 7, additional message flows between client 110 and Web Service 120 over communication network 130 for invoking an extended operation executable by Web Service 120 and checking the operational status of a transaction are shown. Client 110 discovers available extended operations by issuing to Web Service 120 an extended operations discovery request (DISCOVERY REQ) and receiving from Web Service 120 in response to the discovery request an extended operations discovery response (DISCOVERY RESP) having extended operations information. Once client 110 has discovered available extended operations, client 110 invokes an extended operation by issuing to Web Service 120 an extended operation invocation request message (INVOKE REQ). The invocation request message includes an operation identifier (op) that uniquely identifies the invoked extended operation and a transaction identifier (pid) that uniquely identifies the transaction between client 110 and Web Service 120. The invocation request message may additionally include arguments (args) that indicate a requested action. After a predetermined time without receiving a response, client 110 issues to Web Service 120 an extended operation status request message (STATUS REQ). The status request includes an operation identifier (op) that identifies the request as a status request (e.g. "$$status") and a transaction identifier (pid) that is the same as the transaction identifier in the invocation request. In some embodiments, the invocation request and the status request are SOAP messages that use the SOAP method "Invoke" reserved for extended operations requests and XML_DOC_SET_TYPE descriptor type to express the requested extended operation and status. In response to the status request, Web Service 120 checks the operational status of the transaction and returns to client 110 an extended operation status response (STATUS RESP) having status information indicating the operational status of the transaction. The status response includes an operation identifier (op) that identifies the response as a status response (e.g. "$$status"), a transaction identifier (pid) that is the same as in the invocation request and the status request and a result (InvokeResults) with the status information. Eventually, Web Service 120 returns to client 110 an extended operation invocation response type message (INVOKE RESP) having a result generated through execution by Web Service 120 of the requested extended operation. The invocation response message type includes an operation identifier (op) that uniquely identifies the invoked extended operation and a transaction identifier (pid) that uniquely identifies the transaction between client 110 and Web Service 120. The invocation response message type may additionally include a result (InvokeResults) generated through execution of the requested extended operation. In some embodiments, the status response and the invocation response are SOAP messages that use the SOAP method "InvokeResponse" reserved for extended operations responses and XML_DOC_DSC_TYPE descriptor type to express status and the result obtained through execution of the requested extended operation.

Referring to FIGS. 8A and 8B, user screens describe an exemplary extended operation status request and response pair used to discover the operational status of a pending transaction. An exemplary status request is described in FIG. 8A as a SOAP message using the SOAP method "Invoke" and that includes an operation identifier "$$status" and a transaction identifier "1234" indicating that client 110 is requesting status for an earlier initiated transaction associated with transaction identifier "1234". An exemplary status response to the status request is described in FIG. 8B as a SOAP message using the SOAP method "InvokeResponse" and that includes the same operation identifier "$$status", the same transaction identifier "1234" and a result that reveals that the operational status of the transaction as "running".

FIG. 9 shows additional message flows between client 110 and Web Service 120 over communication network 130 for requesting and then terminating a request for invocation of an extended operation executable by Web Service 120. Client 110 discovers available extended operations by issuing to Web Service 120 an extended operations discovery request (DISCOVERY REQ) and receiving from Web Service 120 in response to the discovery request an extended operations discovery response (DISCOVERY RESP) having extended operations information. Once client 110 has discovered available extended operations, client 110 invokes an extended operation by issuing to Web Service 120 an extended operation invocation request message (INVOKE REQ). The invocation request message includes an operation identifier (op) that uniquely identifies the invoked extended operation and a transaction identifier (pid) that uniquely identifies the transaction between client 110 and Web Service 120. The invocation request message may additionally include arguments (args) that specify a requested action. When the pending transaction is sought to be terminated prior to completion, client 110 issues to Web Service 120 an extended operation termination request (CANCEL REQ). The termination request includes an operation identifier (op) that identifies the request as a termination request (e.g. "$$cancel") and a transaction identifier (pid) that is the same as the transaction identifier in the invocation request. In some embodiments, the invocation request and the termination request are SOAP messages that use the SOAP method "Invoke" reserved for extended operations requests and XML_DOC_SET_TYPE descriptor type to express the requested extended operation and termination. In response to the termination request, Web Service 120 terminates the transaction including any in-progress operations associated therewith and returns to client 110 an extended operation termination response (CANCEL RESP) having status information indicating termination of the transaction. The termination response includes an operation identifier (op) that identifies the response as a termination response (e.g. "$$cancel"), a transaction identifier (pid) that is the same as in the invocation request and the termination request and a result (InvokeResults) with the status information. In some embodiments, the termination response is a SOAP message that uses the SOAP method "InvokeResponse" reserved for extended operations responses and XML_DOC_DSC_TYPE descriptor type to express cancelled transaction status.

Naturally, other and further message flows are possible, such as an extended operation termination request and response sequence that proceeds after an extended operation status request and response sequence.

Referring finally to FIGS. 10A and 10B, user screens describe an exemplary extended operation termination request and response pair used to cancel a pending transaction. An exemplary termination request is described in FIG. 10A to be a SOAP message using the SOAP method "Invoke" that includes an operation identifier "$$cancel" and a transaction identifier "1234" indicating that client 110 is requesting termination of an earlier initiated transaction associated with transaction identifier "1234". An exemplary termination response to the termination request is described in FIG. 10B to be a SOAP message using the SOAP method "InvokeResponse" that includes the same operation identifier "$$cancel", the same transaction identifier "1234" and a result that reveals the status of the transaction as "cancelled".

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. In a communication system having a service implemented by a processor on a services host device adapted to execute defined operations and extended operations and a client implemented by a processor on a client host device adapted to request execution by the service of defined operations and extended operations, a method performed by the client for invoking at least one of the extended operations, comprising the steps of:

transmitting by the client to the service an extended operation invocation request identifying the at least one extended operation; and receiving by the client from the service in response to the invocation request an extended operation invocation response having a result obtained through execution by the service of the at least one extended operation, wherein the invocation request is a SOAP message that utilizes a SOAP method reserved for extended operation requests, and wherein the invocation response is a SOAP message that utilizes a SOAP method reserved for extended operation responses;

wherein the invocation request and the invocation response each comprise a transaction identifier that uniquely identifies a transaction between the client and the service; and transmitting by the client to the service an extended operation status request having the transaction identifier and receiving by the client from the service in response to the extended operation status request an extended operation status response reporting operational status of the transaction, wherein the extended operation status request is a SOAP message that utilizes the SOAP method reserved for extended operation requests, and wherein the extended operation status response is a SOAP message that utilizes the SOAP method reserved for extended operation responses.

2. The method of claim 1, wherein the defined operations are defined in a Web Services Description Language (WSDL) definition document for the service and the extended operations are not defined in any WSDL definition document for the service.

3. The method of claim 1, wherein the extended operations are enabled for the service after the defined operations.

4. The method of claim 1, wherein the invocation request and the invocation response each comprise an operation identifier that uniquely identifies the invoked extended operation.

5. The method of claim 1, further comprising the step of receiving by the client from the service an extended operation discovery message reporting availability of the at least one extended operation.

6. In a communication system having a service implemented by a processor on a services host device adapted to execute defined operations and extended operations and a client implemented by a processor on a client host device adapted to request execution by the service of defined operations and extended operations, a method performed by the service for executing at least one of the extended operations invoked by the client, comprising the steps of:

receiving by the service from the client an extended operation invocation request identifying the at least one extended operation; and transmitting by the service to the client in response to the invocation request an extended operation invocation response having a result obtained through execution by the service of the at least one extended operation, wherein the invocation request is a SOAP message that utilizes a SOAP method reserved for extended operation requests, and wherein the invocation response is a SOAP message that utilizes a SOAP method reserved for extended operation responses;

wherein the invocation request and the invocation response each comprise a transaction identifier that uniquely identifies a transaction between the client and the service; and receiving by the service from the client an extended operation status request having the transaction identifier and transmitting by the service to the client in response to the extended operation status request and extended operation status response reporting operational status of the transaction, wherein the extended operation status request is a SOAP message that utilizes the SOAP method reserved for extended operation requests, and wherein the extended operation status response is a SOAP message that utilizes the SOAP method reserved for extended operation responses.

7. The method of claim 6, wherein the defined operations are defined in a WSDL definition document for the service and the extended operations are not defined in any WSDL definition document for the service.

8. The method of claim 6, wherein the extended operations are enabled for the service after the defined operations.

9. The method of claim 6, wherein the invocation request and the invocation response each comprise an operation identifier that uniquely identifies the invoked extended operation.

10. The method of claim 6, further comprising the step of transmitting by the service to the client an extended operation discovery message reporting availability of the at least one extended operation.

11. In a communication system having a service implemented by a processor on a services host device adapted to execute defined operations and extended operations and a client implemented by a processor on a client host device adapted to request execution by the service of defined operations and extended operations, a method performed by the client for invoking at least one of the extended operations, comprising the steps of:

transmitting by the client to the service an extended operation invocation request having a transaction identifier uniquely identifying a transaction;

transmitting by the client to the service an extended operation status request having the transaction identifier; and receiving by the client from the service an extended operation status response having the transaction identifier and reporting operational status of the transaction, wherein the invocation request and the extended operation status request are SOAP messages that utilize a SOAP method reserved for extended operation requests and the extended operation status response is a SOAP message that utilizes a SOAP method reserved for extended operation responses.

12. The method of claim 11, further comprising:

transmitting by the client to the service an extended operation termination request having the transaction identifier; and receiving by the client from the service an extended operation termination response having the transaction identifier and reporting cancelled status of the transaction, wherein the termination request is a SOAP message that utilizes the SOAP method reserved for extended operation requests and the termination response is a SOAP message that utilizes the SOAP method reserved for extended operation responses.

* * * * *